(12) United States Patent
Chen

(10) Patent No.: US 6,550,297 B1
(45) Date of Patent: Apr. 22, 2003

(54) AUTOMOBILE STEERING WHEEL LOCK WITH ALARM FUNCTION

(76) Inventor: Tian-Yuan Chen, P.O. Box 90, Tainan City (TW)

( * ) Notice: Subject to any disclaimer, the term of this patent is extended or adjusted under 35 U.S.C. 154(b) by 0 days.

(21) Appl. No.: 10/140,880

(22) Filed: May 9, 2002

(51) Int. Cl.[7] ............................................. B60R 25/02
(52) U.S. Cl. ......................... 70/209; 70/211; 70/225; 70/226; 70/237; 70/DIG. 49
(58) Field of Search .......................... 70/209, 211, 212, 70/225, 226, 237, 238, DIG. 49

(56) References Cited

U.S. PATENT DOCUMENTS

| | | | | |
|---|---|---|---|---|
| 5,398,017 A | * | 3/1995 | Chen | 340/426 |
| 5,609,050 A | * | 3/1997 | Yu | 70/209 |
| 5,636,537 A | * | 6/1997 | Chen | 70/209 |
| 5,671,619 A | * | 9/1997 | Hou | 70/209 |
| 5,676,000 A | * | 10/1997 | Chen | 70/209 |
| 5,678,434 A | * | 10/1997 | Kuo et al. | 70/209 |

* cited by examiner

Primary Examiner—Anthony Knight
Assistant Examiner—Christopher Boswell (57) ABSTRACT

An automobile steering wheel lock with alarm function in the invention has a locking means combined in a lock housing of a lock body and comprising a sleeve, several core plates, two actuating rods, a driving member, a shell, a moving member and an alarm device having a circuit plate connecting a buzzer plate with electric cords and two actuating pieces corresponding to the actuating rods. The actuating rods can pass through the core plates and the driving member having an axle rod fixed with the circuit plate and an end inserted in the moving member. The alarm device will sound when a tool is inserted to push one of the actuating rods to contact with one of the actuating pieces, but not sound when a matching key is inserted to match with the core plates to make both actuating rods contact with or withdraw from the actuating pieces simultaneously.

2 Claims, 8 Drawing Sheets

AUTOMOBILE STEERING WHEEL LOCK WITH ALARM FUNCTION

BACKGROUND OF THE INVENTION

1. Field of the Invention

This invention relates to an automobile steering wheel lock with alarm function, particularly to one having a locking means combined in a lock housing of a steering wheel lock body, the locking means comprising a sleeve, several core plates, two actuating rods, a driving member, a shell, an alarm device and a moving member, wherein the actuating rods can pass through the core plates and the driving member, the driving member having an axle rod fixed securely with a circuit plate of the alarm device and an end inserted in the moving member, the circuit plate of the alarm device having two actuating pieces respectively corresponding in location to the actuating rods and connecting a buzzer plate with electric cords, whereby when a matching key is inserted in the locking means, the key can match with the core plates to make the two actuating rods contact with or withdraw from the two actuating pieces simultaneously, thereby preventing the alarm device from sounding; otherwise, if other tools are inserted to force one of the first actuating rods to pass through the driving member to rotate the moving member, it is likely to have only one of the actuating rods to move forwards to contact with one of the actuating pieces of the circuit plate, thus activating said alarm device to sound for alarm.

2. Description of the Prior Art

Generally speaking, most known conventional automobile steering wheel locks use a key for locking and unlocking. Such steering wheel locks provided with locking devices are adapted to be locked on the steering wheels to limit the rotation of the steering wheels, thereby preventing the automobiles from being stolen by thieves. Therefore, the locking devices are designed to be more and more complicated for increasing their anti-theft capacity. However, no matter how complicated these known locking devices are constructed, the lock cores of the locking devices are often easily pried open by skilled thieves with special tools or mater keys in a short time, thus losing the anti-theft function.

SUMMARY OF THE INVENTION

The main purpose of the invention is to offer an automobile steering wheel lock with alarm function by having a locking means combined in a lock housing of a steering wheel lock body, the locking means equipped with an alarm device.

The main feature of the invention is to provide an automobile steering wheel lock with alarm function mainly including:

a steering wheel lock body having a lock housing disposed at one side thereof, and a lock pin as well as a fix bolt disposed therein; and, a locking means combined in the lock housing of the steering wheel lock body, comprising a sleeve, a first core plate, a second core plate, a third core plate, a first actuating rod, a second actuating rod, a driving member, a shell, an alarm device and a moving member; the sleeve having a keyhole formed at one side thereof and two opposite slide rails disposed in an inner wall therein, the two opposite slide rails provided with a plurality of engagement grooves corresponding in location to each other; the first, second and third core plates accommodated in the sleeve, each of the core plates having a central hole, a plurality of through holes and two notches corresponding in location to the two opposite slide rails of the sleeve; the first and second actuating rods accommodated in the sleeve, respectively fitted with a first spring and a second spring, and capable of passing through the core plates and the driving member, the first actuating rod having a retainer provided to be pushed by the third core plate, and the second actuating rod having a stop portion disposed at a top thereof and provided to be stopped against and pushed by the first core plate; the driving member accommodated in the sleeve and located below the third core plate and capable of being passed through by the first and second actuating rods, a third spring located in between the third core plate and the driving member; the driving member having an axle rod extending downwards from a lower surface thereof, the axle rod having an engagement block disposed at one end thereof; the shell connected with the sleeve and having a recess and a chamber, the recess having a through hole formed at a bottom thereof, the chamber extending from one side of the shell and communicating with the recess; the alarm device accommodated in the shell and comprising a circuit plate, a buzzer plate and a cap, the circuit plate fixed securely to the axle rod of the driving member and having two actuating pieces disposed on an upper surface of the circuit plate and respectively corresponding in location to the first and second actuating rods, the buzzer plate and the cap disposed in the chamber of the shell, the buzzer plate connecting the circuit plate with electric cords; the moving member attached to a bottom of the shell and having an insertion groove disposed in a center of one side thereof and corresponding in location to the through hole of the recess of the shell for the engagement block of the axle rod of the driving to insert in and engage firmly, the moving member having a block disposed at the other side thereof for moving the lock pin of the steering wheel lock body.

BRIEF DESCRIPTION OF DRAWINGS

This invention will be better understood by referring to the accompanying drawings, wherein.

DETAILED DESCRIPTION OF THE PREFERRED EMBODIMENT

A preferred embodiment of an automobile steering wheel lock with alarm function in the present invention, as shown in FIGS. 1 to 4, mainly includes a steering wheel lock body 1 and a locking means 2.

Figure 1:
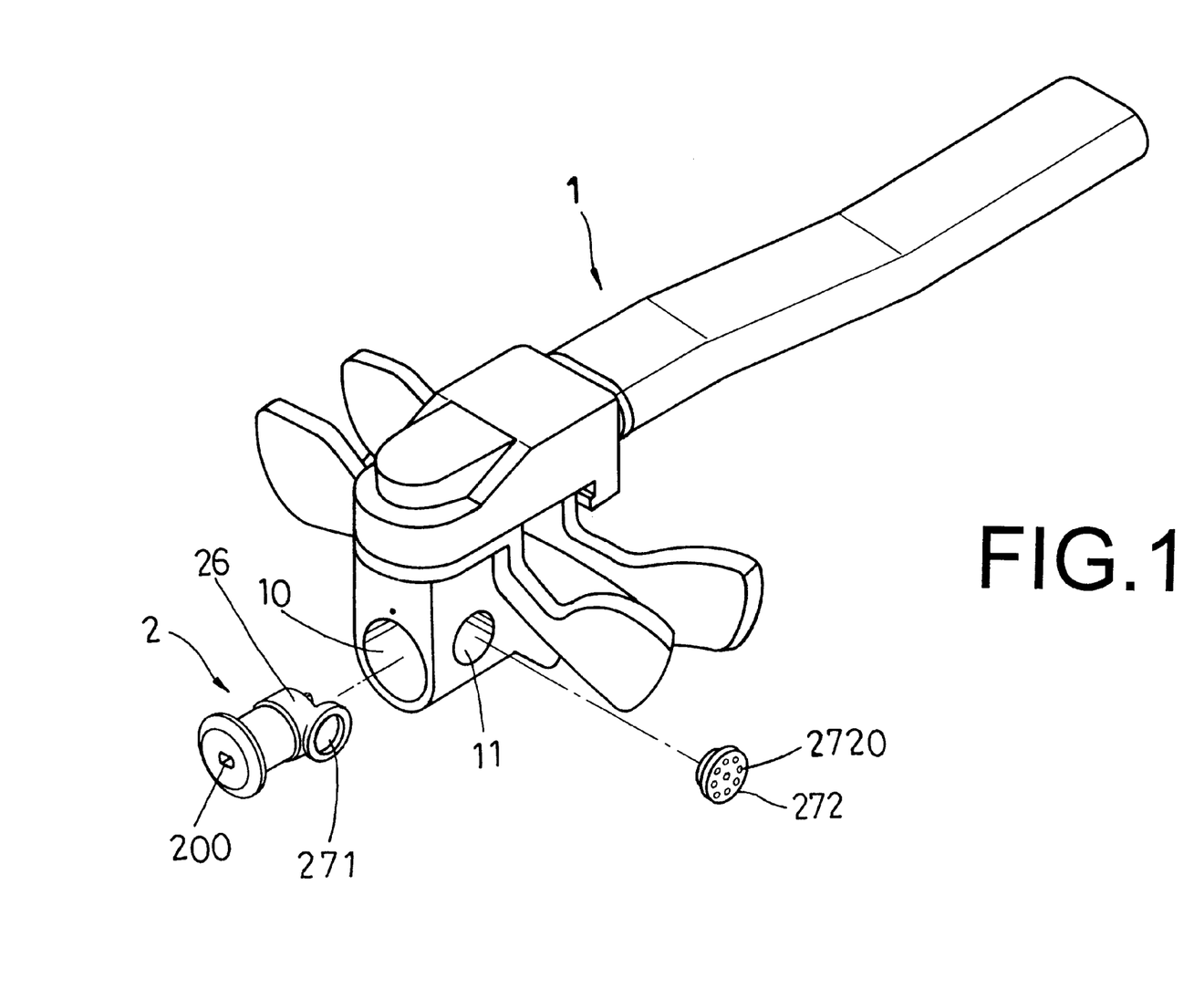
FIG. 1 is an exploded perspective view of an automobile steering wheel lock with alarm function in the present invention.

The steering wheel lock body 1 has a lock housing 10 provided with an open 11 formed at one side thereof.

Figure 2:
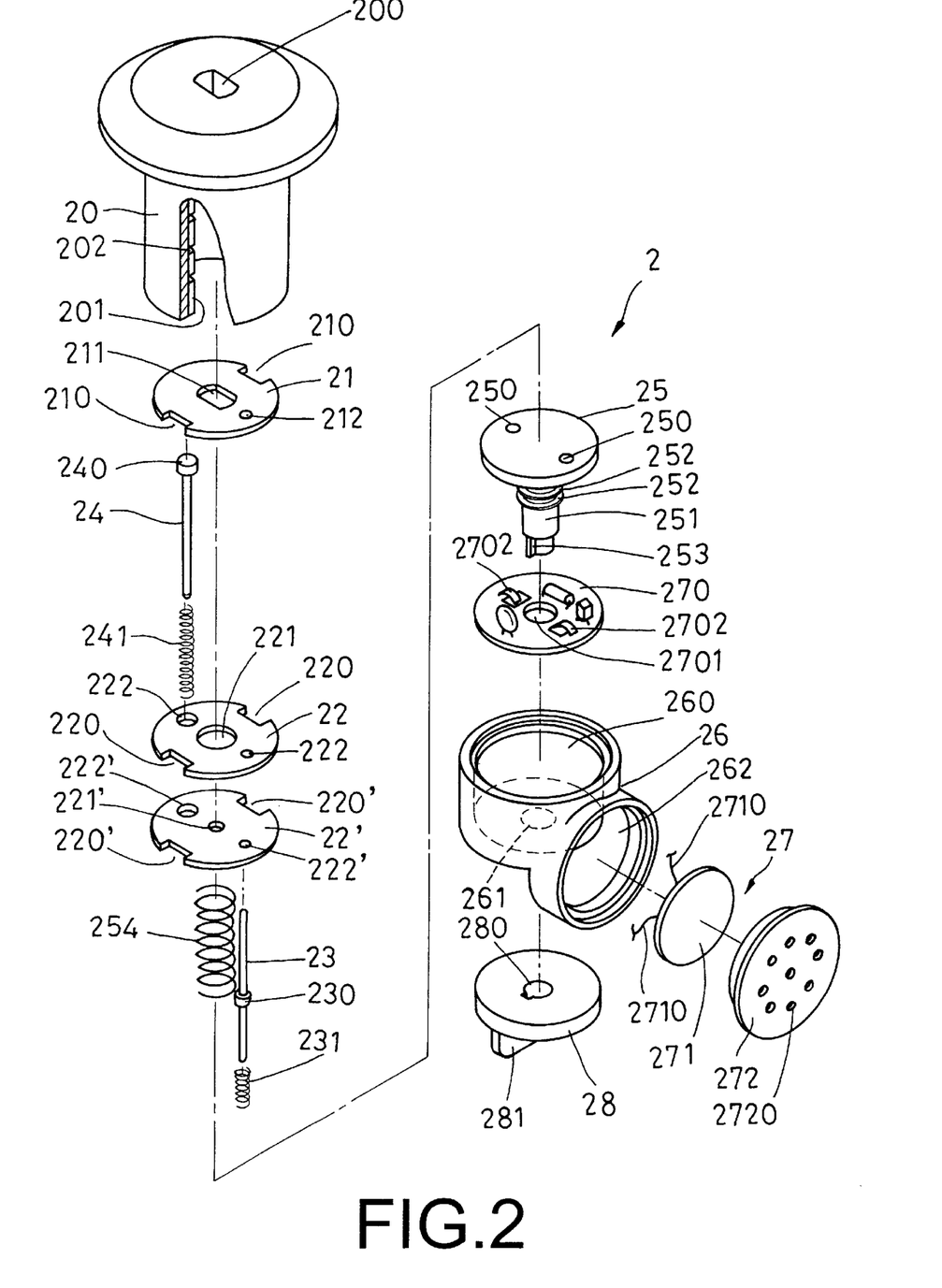
FIG. 2 is an exploded perspective view of a locking means in the present invention.
Figure 3:
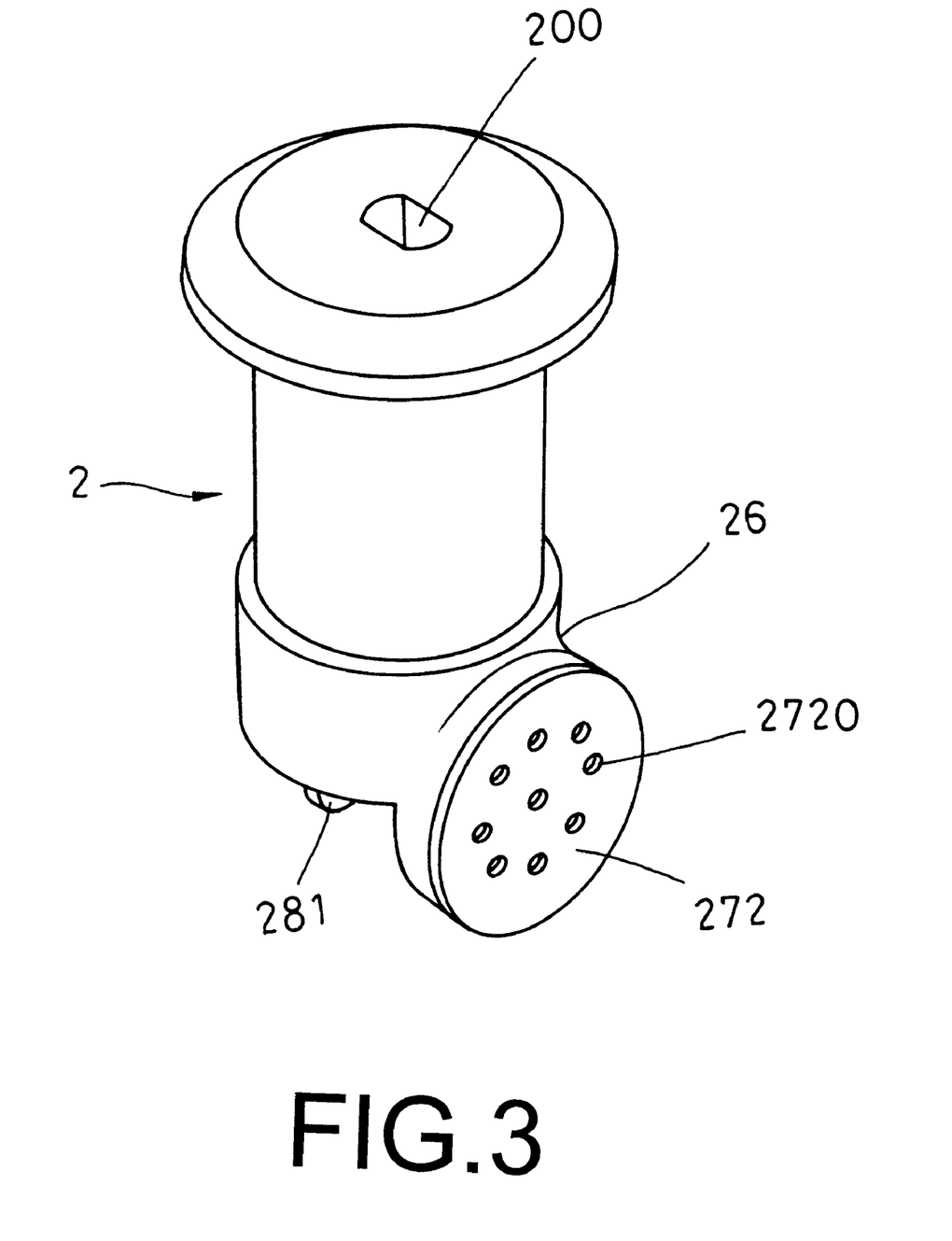
FIG. 3 is a perspective view of the locking means in the present invention.

The locking means 2 combined in the lock housing 10 of the steering wheel lock body 1 has a sleeve 20, a first core plate 21, a second core plate 22, a third core plate 22', a first actuating rod 23, a second actuating rod 24, a driving member 25, a shell 26, an alarm device 27 and a moving member 28.

The sleeve 20 has a keyhole 200 formed in one side thereof and two opposite slide rails 201 disposed in an inner wall therein and provided with a plurality of engagement grooves 202 corresponding in location to each other. The first, second and third core plates 21, 22, 22', the first and second actuating rods 23, 24, and the driving member 25 are accommodated in the sleeve 20.

The first core plate 21 has a central hole 211, two notches 210, 210 corresponding in location to the two opposite slide rails 201 of the sleeve 20, and a through hole 212 formed at one side thereof. The second and third 22, 22' respectively have a central hole 221 as well as 221', two notches 220, 220 as well as 220', 220' corresponding in location to the two opposite slide rails 201 of the sleeve 20, and two through holes 222, 222 as well as 222', 222' formed at both sides thereof.

The first and second actuating rods 23, 24 can respectively pass through the through holes 212, 222, 222' of the first, second and third core plates 21, 22, 22'. The first actuating rod 23 has a retainer 230 disposed in a middle portion thereof, corresponding in location to one of the two through holes 222' of the third core plate 22' and provided to make the first actuating rod 23 pushed downwards by the third core plate 22'. A lower portion of the first actuating rod 23 located below the retainer 230 is fitted with a first spring 231. The second actuating rod 24 capable of passing through the second and third core plates 22, 22' has a stop portion 240 disposed at a top thereof and provided to be stopped against by the first core plate 21. The second actuating rod 24 is also fitted with a second spring 241.

The driving member 25 capable of being passed through by the first and second actuating rods 23, 24, has two through holes 250, 250 formed in an upper surface thereof and respectively corresponding in location to the through holes 212, 222, 222' of the first, second and third core plates 21, 22, 22'. The driving member 25 further has an axle rod 251 extending downwards from a lower surface thereof. The axle rod 251 has two annual ridges 252, 252 disposed at a proper location thereof and an engagement block 253 disposed at one end thereof. A third spring 254 larger than the first and second springs 231, 241 is located in between the third core plate 22' and the driving member 25 and can urge the third core plate 22' upwards to make the first, second and third core plates 21,22, 22' stacked together and limited in a front portion of the sleeve 20.

The shell 26 connected with the sleeve 20 has a recess 260 provided with a through hole 261 formed at a bottom thereof and capable of being extended through by the axle rod 251 of the driving 25 with the engagement block 253 of the axle rod 251 extending through the through hole 261 of the recess 260. The shell 26 further has a chamber 262 extending from one side of the shell 26 and communicating with the recess 260.

The alarm device 27 accommodated in the shell 26 and comprising a circuit plate 270, a buzzer plate 271 and a cap 272. The circuit plate 270 has a through hole 2701 formed in a center thereof for being fitted by the axle rod 251 of the driving member 25 and capable of being firmly engaged in between the two annual ridges 252, 252 of the axle rod 251 so that the circuit plate 27 can be firmly fixed to the driving member 25 in location. The circuit plate 270 further has two actuating pieces 2702 disposed on an upper surface of the circuit plate 270 and respectively corresponding in location to the first and second actuating rods 23, 24. The buzzer plate 271 and the cap 272 are combined in the chamber 262 of the shell 26. The buzzer plate 271 connects the circuit plate 270 with electric cords 2710. The cap 272 spreading with a plurality of through holes 2720 is covered at an outer side of the buzzer plate 271.

The moving member 28 attached to a bottom of the shell 26 has an insertion groove 280 disposed in a center of one side thereof and corresponding in location to the through hole 261 of the recess 260 of the shell 26 for the engagement block 253 of the axle rod 252 of the driving 25 to insert in and engage firmly. The moving member 28 further has a block 281 disposed at the other side thereof and corresponding in location to the lock pin 12 of the steering wheel lock body 1 for actuating the lock pin 12 to move forward or backward, thereby locking or unlocking the steering wheel lock body 1.

In assembling, referring to FIGS. 1 to 5, firstly place the alarm device 27 into the shell 26 with the circuit plate 270 firmly fixed to the driving member 25. Secondly, pass both lower ends of the first and second actuating rods 23, 24 already fitted with the first and second springs 231, 241 respectively through the two through holes 250, 250 of the driving member 25. Thirdly, extend the first actuating rod 23 through the first, second and third core plates 21, 22, 22' and extend the second actuating rod 24 through the second and third core plates 22, 22, 22'. Fourthly, combine the sleeve 20 and the shell 26 together securely with the assembled first, second and third core plates 21, 22, 22' and the first and second actuating rods 23, 24 accommodated inside. Fifthly, attach the moving member 28 to the bottom of the shell 26 with the engagement block 253 of the axle rod 251 of the driving member 25 firmly engaged with the moving member 28. Finally, combine the assembled locking means 2 in the lock housing 10 of the steering wheel lock body 1 and fitly cover the cap 272 of the alarm device 27 on the opening 11 of the steering wheel lock body 1, thus finishing the assembly of the automobile steering wheel lock with alarm function in the present invention.

Figure 4:
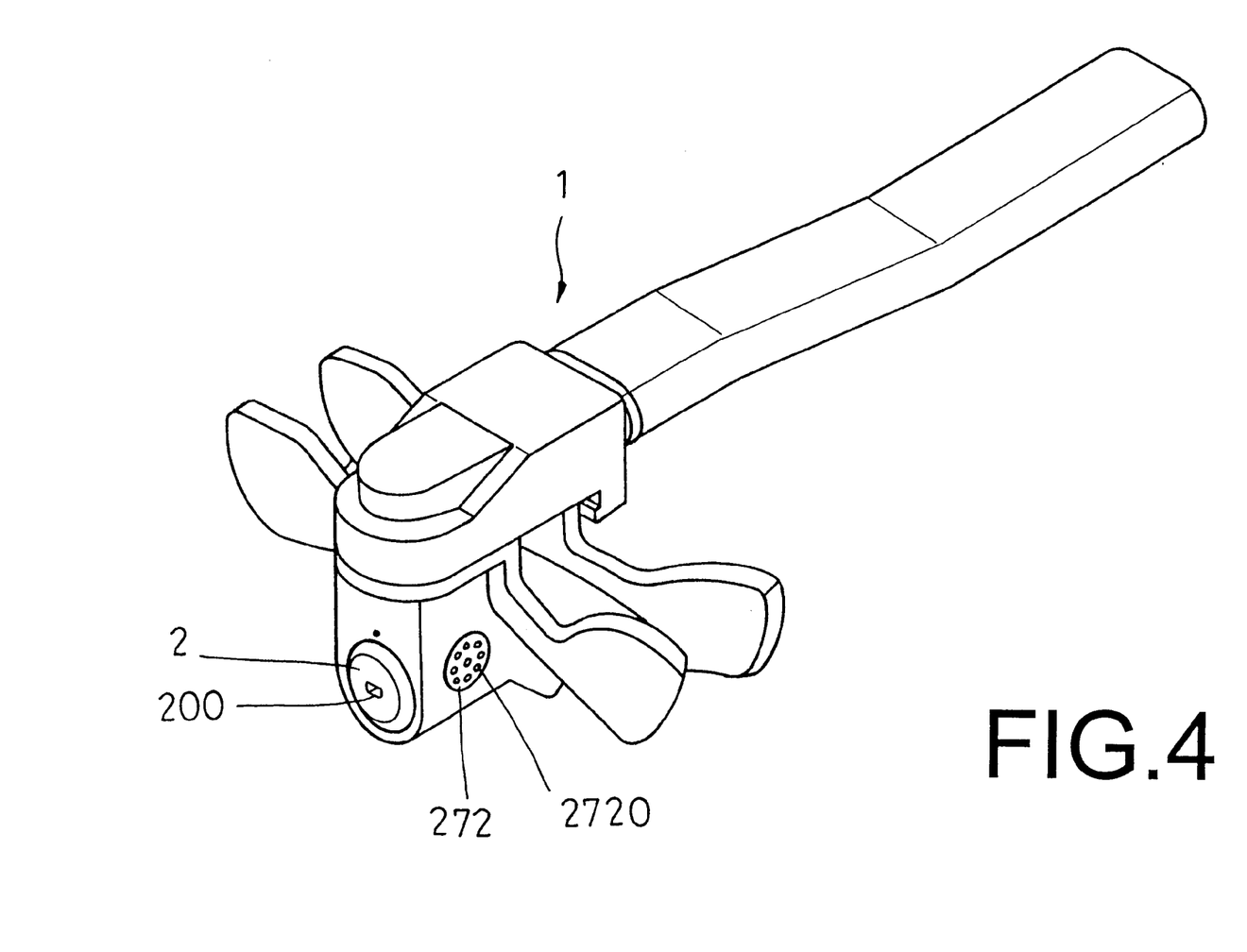
FIG. 4 is a perspective view of the automobile steering wheel lock with alarm function in the present invention.
Figure 5:
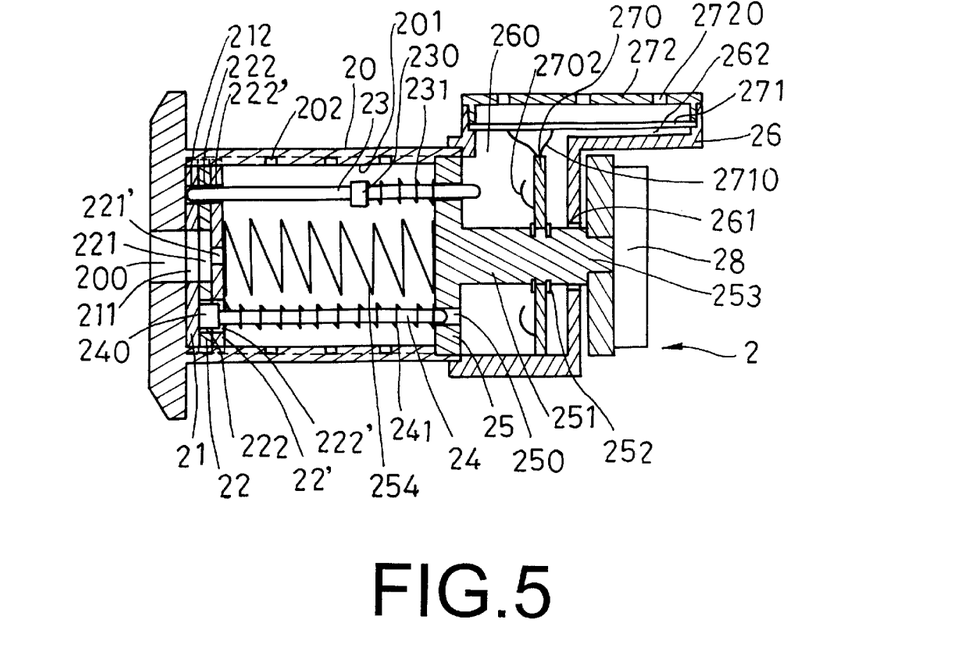
FIG. 5 is a sectional view of the locking means in the present invention being in a locked condition.
Figure 6:
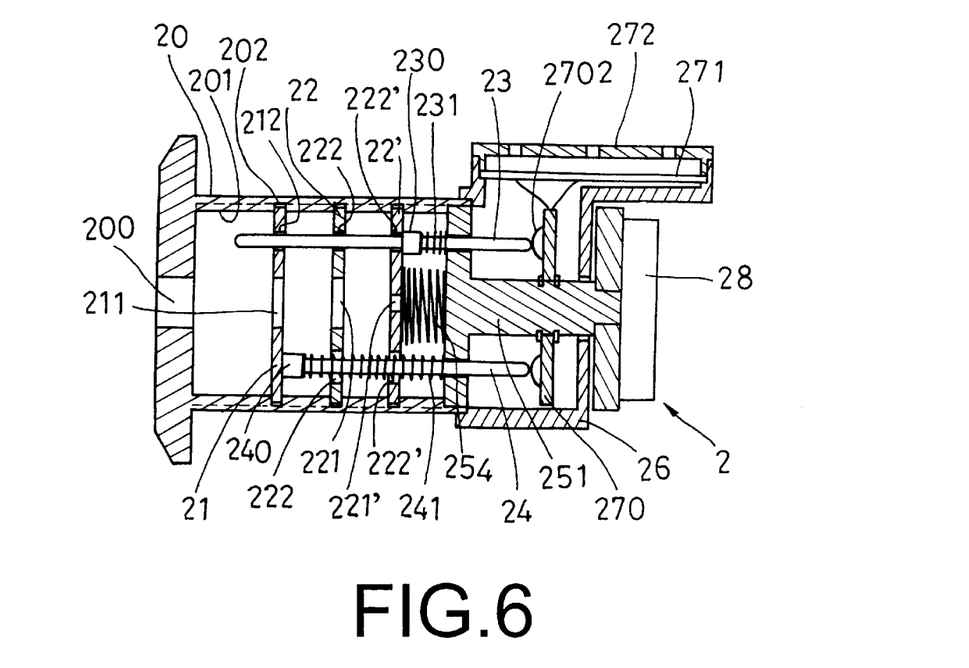
FIG. 6 is a sectional view of the locking means in the present invention being in an unlocked condition.
Figure 7:
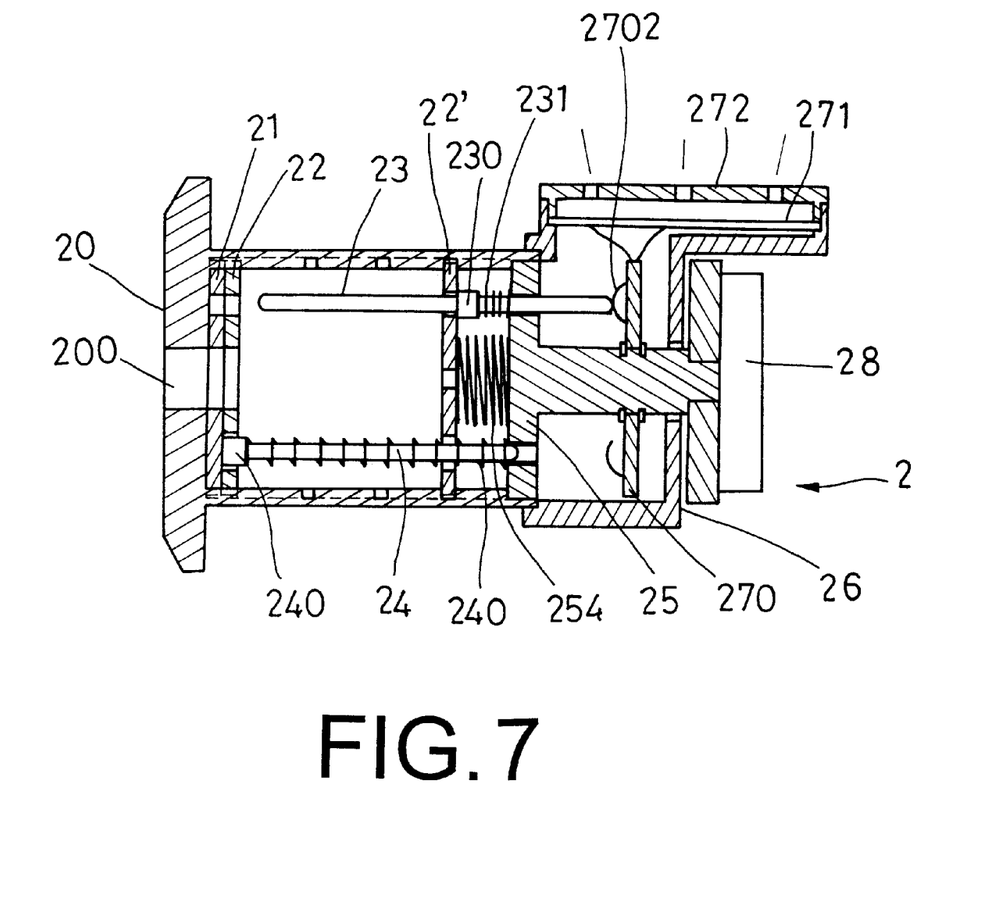
FIG. 7 is a sectional view of the locking means in the present invention, showing that one of actuating rods is pushed forwardly to come into contact with one of actuating pieces of a circuit plate to make an alarm device sound loudly for alarming.
Figure 8:
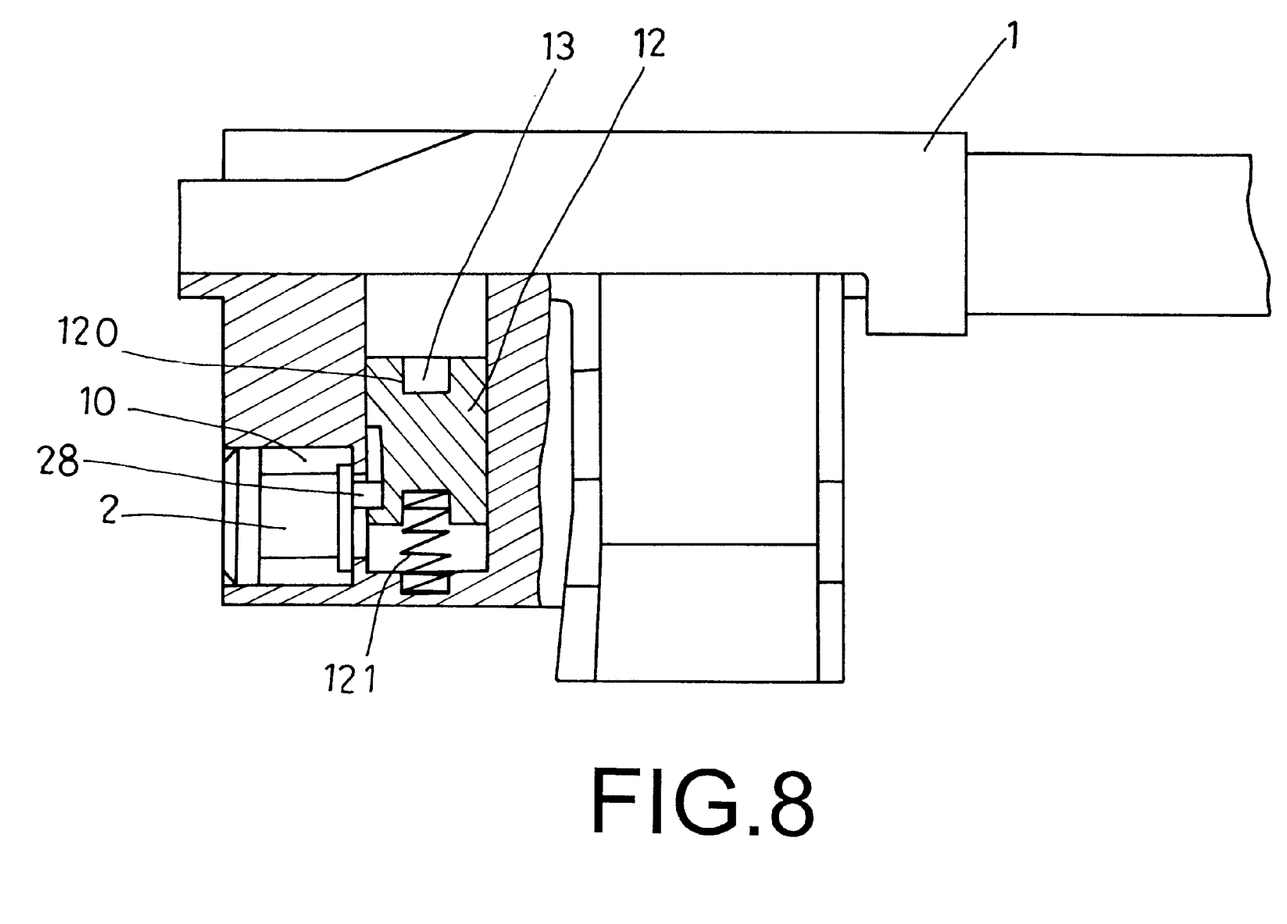
FIG. 8 is a sectional view of the automobile steering wheel lock with alarm function in the present invention being in a locked condition with a fix bolt engaged by a lock pin that is not actuated by a member of the locking means; and, FIG. 9 is a sectional view of the automobile steering wheel lock with alarm function in the present invention being in an unlocked condition with a fix bolt disengaged from a lock pin that is actuated by the member of the locking means.
Figure 9:
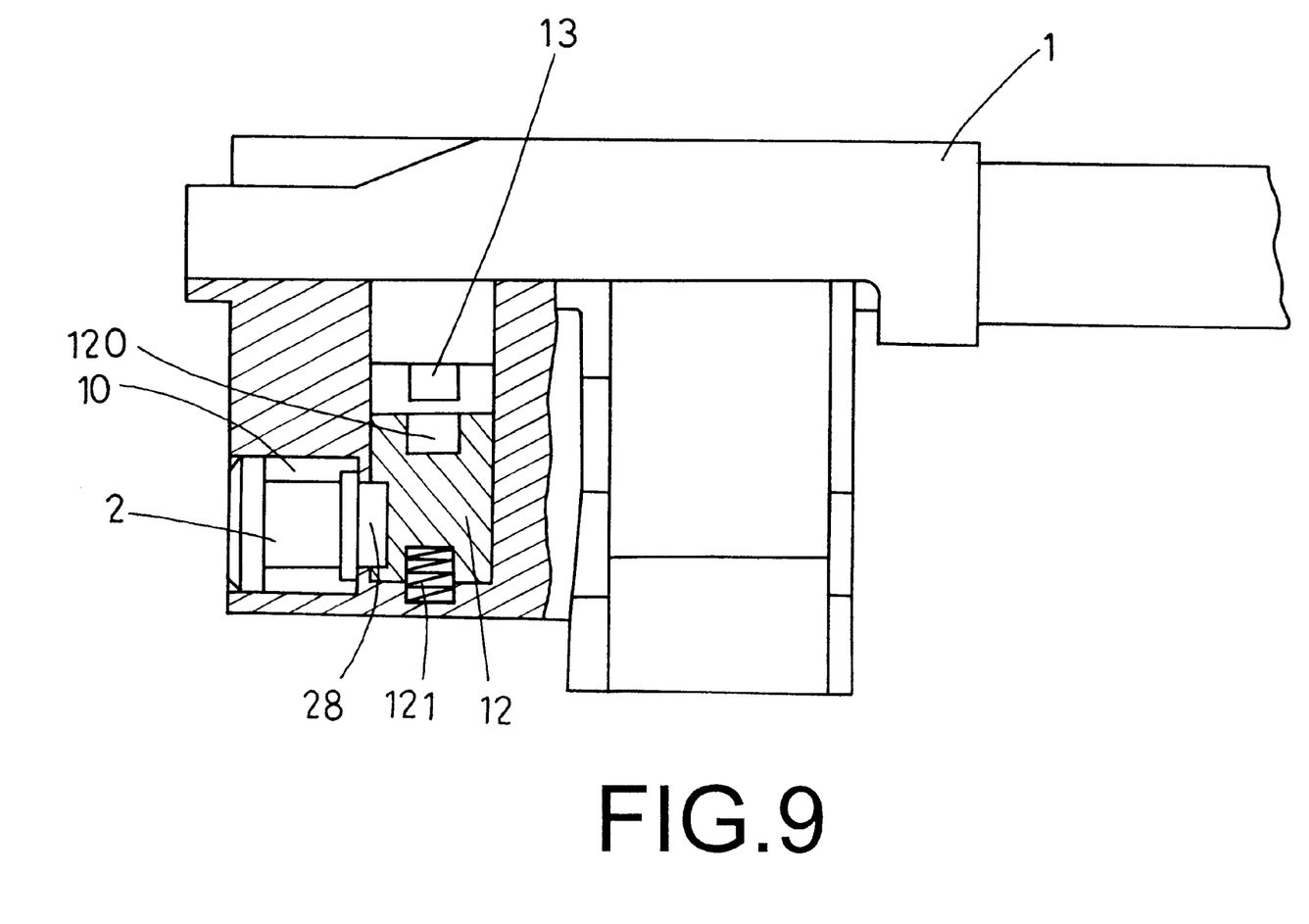

In using, referring to FIGS. 4 to 9, when a key (not shown) is inserted in the locking means 2 to turn the first, second and third core plates 21, 22, 22' to drive the driving member 25 to rotate the moving member 28 to actuate the lock pin 12, the lock pin 12 will compress a fourth spring 121 disposed at one end the lock pin 12 to make the fix bolt 13 of the steering wheel lock body 1 disengaged from the engagement groove 120 disposed at the other end of the lock pin 12, thereby unlocking the steering wheel lock body 1, as shown in FIG. 9. However, when the moving member 28 is rotated to a reverse direction and no longer actuates the lock pin 12 to compress the fourth spring 121, the fourth spring 121 will urge the lock pin 12 upwards with resilience to make the engagement groove 120 firmly engaging with the fix bolt 13 of the steering wheel lock body 1, as shown in FIG. 8, thereby locking the steering wheel lock body 1 on an automobile steering wheel. Therefore, when the locking means 2 is in a lock condition, the third spring 254 will urge the first, second and third core plates 21, 22, 22' upwards to be stacked together and limited in a front portion of the sleeve 20. At the same time, the first and second actuating rod 23, 24 are also urged by the first and second spring 231, 241 upwards, as shown in FIG. 5.

When unlocking, in order to rotate the moving member 28 to actuate the lock pin 12 of the steering wheel lock body 1 and successfully relieve the engagement of the lock pin 12 and the fix bolt 13, a key is inserted in the keyhole 200 of the sleeve 20, as shown in FIG. 4, to make the first, second and third core plates 21, 22, 22' displaced in turn with proper distance. Firstly, the third core plate 22' is moved forwards to compress the third spring 254 and simultaneously press the first actuating rod 23 downwards to make the retainer 230 of the first actuating rod 23 compress the first spring 231 fitted around the lower portion of the first actuating rod 23. At the same time, the first and second core plates 21, 22 are also moved forwards so that the first core plate 21 is capable of pressing the stop portion 240 of the second actuating rod 24 to compress the second spring 241 fitted around the second actuating rod 24, thereby making both ends of the first and second actuating rods 23, 24 simultaneously contacting with the two actuating pieces 2702 of the circuit plate 270 without activating the alarm device 27 to sound, as shown in FIG. 6. Moreover, when the key is further turned, the first and second actuating rods 23, 24 already passing through the two through holes 250 of the driving member 25 can drive the driving member 25 to rotate the moving member 28 with the ends of the first and second actuating rods 23, 24 still keeping simultaneous contact with the two actuating pieces 2702 of the circuit plate 270 that are fixed to the axle rod 251 of the driving member 25. The moving member 28 is thus capable of actuating the lock pin 12 of the steering wheel lock body 1, as shown in FIG. 9. Moreover, after the first and second actuating rods 23, 24 are turned by the key, their peripheral edges are engaged in the corresponding engagement grooves 202 of the two opposite slide rails 201, thereby making the first and second actuating rods 23, 24 placed in location.

The invention is designed to make the first and second actuating rods 23, 24 contact with or withdraw from the two actuating pieces 2702 of the circuit plate 270 simultaneously, and this can be achieved only by a matching key so as to prevent the alarm device 27 from sounding.

In case that a non-matching key is inserted in the locking means 2 to forcedly unlock the steering wheel lock body 1, in order to rotate the moving member 28 to actuate the lock pin 12 of the steering wheel lock body 1, the first actuating rod 23 or the second actuating rod 24 is forced to pass through one of the two through holes 250 of the driving member 25 to contact with only one of the two actuating pieces 2702 of the circuit plate 270, thus activating the alarm device 27 to sound for alarm.

When a picking tool is inserted in the locking means 2 without making the three core plates 21, 22, 22' displaced and arranged with proper distance, the tool is likely to touch the third core plate 22' firstly and press the third core plate 22' to push the first actuating rod 23 forwards and make the end of the first actuating rod 23 contact with only one of the two actuating pieces 2702 of the circuit plate 270, thus activating the alarm device 27 to sound for alarm, as shown in FIG. 7. However, if other picking tools are inserted in the locking means 2 in a way of forcedly pushing all the stacked core plates 21, 22, 22' to move forwards, the second actuating rod 24 will be firstly pushed forwards to contact with the other one of the two actuating pieces 2702 of the circuit plate 270, thus also activating the alarm device 27 to sound for alarm.

Therefore, only when a matching key is inserted in the locking means 2 that is combined in the lock housing 10 of the steering wheel lock body 1, the matching key can match with the three core plates 21, 22, 22' to make the two actuating rods 23, 24 contact with or withdraw from the two actuating pieces 2702 of the circuit plate 270 simultaneously, thereby preventing the alarm device from sounding; otherwise, if any other tools are inserted to forcedly push the first actuating rod 23 or the second actuating rod 24 to pass through the driving member 25 to rotate the moving member 8, it is likely to have only one of the actuating rods 23 or 24 to move forwards to contact with one of the actuating pieces 2702 of the circuit plate 270, thus activating said alarm device 27 to sound for alarm.

While the preferred embodiment of the invention has been described above, it will be recognized and understood that various modifications may be made therein and the appended claims are intended to cover all such modifications that may fall within the spirit and scope of the invention.

What is claimed is:

1. An automobile steering wheel lock with alarm function comprising:

a steering wheel lock body having a lock housing disposed at one side thereof, and a lock pin as well as a fix bolt disposed therein;

a locking means combined in said lock housing of said steering wheel lock body, comprising a sleeve, a first core plate, a second core plate, a third core plate, a first actuating rod, a second actuating rod, a driving member, a shell, an alarm device and a moving member; said sleeve having a keyhole formed at one side thereof and two opposite slide rails disposed in an inner wall therein, said two opposite slide rails provided with a plurality of engagement grooves corresponding in location to each other; said first, second and third core plates accommodated in said sleeve, each of said core plates having a central hole, a plurality of through holes and two notches corresponding in location to said two opposite slide rails of said sleeve; said first and second actuating rods accommodated in said sleeve, respectively fitted with a first spring and a second spring, and capable of passing through said core plates and said driving member, said first actuating rod having a retainer provided to be pushed by said third core plate, and said second actuating rod having a stop portion disposed at a top thereof and provided to be stopped against and pushed by said first core plate; said driving member accommodated in said sleeve and located below said third core plate and capable of being passed through by said first and second actuating rods, a third spring located in between said third core plate and said driving member, said driving member having an axle rod extending downwards from a lower surface thereof, said axle rod having an engagement block disposed at one end thereof; said shell connected with said sleeve and having a recess and a chamber, said recess having a through hole formed at a bottom thereof, said chamber extending from one side of said shell and communicating with said recess; said alarm device accommodated in said shell and comprising a circuit plate, a buzzer plate and a cap, said circuit plate securely fixed to said axle rod of said driving member and having two actuating pieces disposed on an upper surface of said circuit plate and respectively corresponding in location to said first and second actuating rods, said buzzer plate and said cap disposed in said chamber of said shell, said buzzer plate connected with said circuit plate by electric cords; said moving member attached to a bottom of said shell and having an insertion groove disposed in a center of one side thereof and corresponding in location to said through hole of said recess of said shell for said engagement block of said axle rod of said driving member to insert in and engage firmly, said moving member having a block disposed at the other side thereof for moving said lock pin of said steering wheel lock body; and, whereby when a matching key is inserted in said locking means combined in said lock housing of said steering wheel lock body, said matching key can match with said core plates to make said two actuating rods contact with or withdraw from said two actuating pieces simultaneously, thereby preventing said alarm device from sounding; otherwise, if other tools are inserted to push said core plates, it is likely to make only one of said actuating rods move forwards to contact with one of said actuating pieces, thus activating said alarm device to sound the alarm.

2. The automobile steering wheel lock with alarm function as claimed in claim 1, wherein said driving member of said locking means further has two through holes for said two actuating rods to pass through, and said axle rod of said driving member further has two annual ridges for firmly mounting said circuit plate of said alarm device.

* * * * *